Patented Sept. 6, 1927.

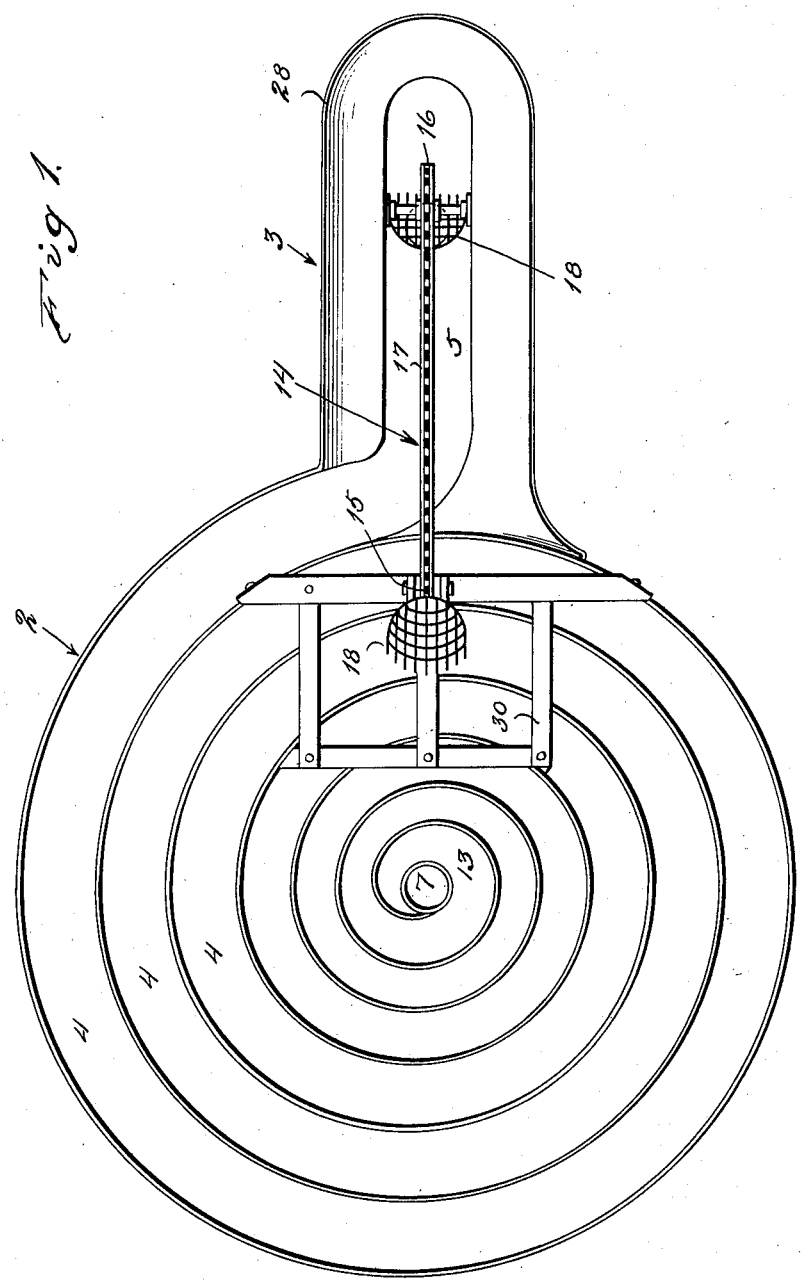

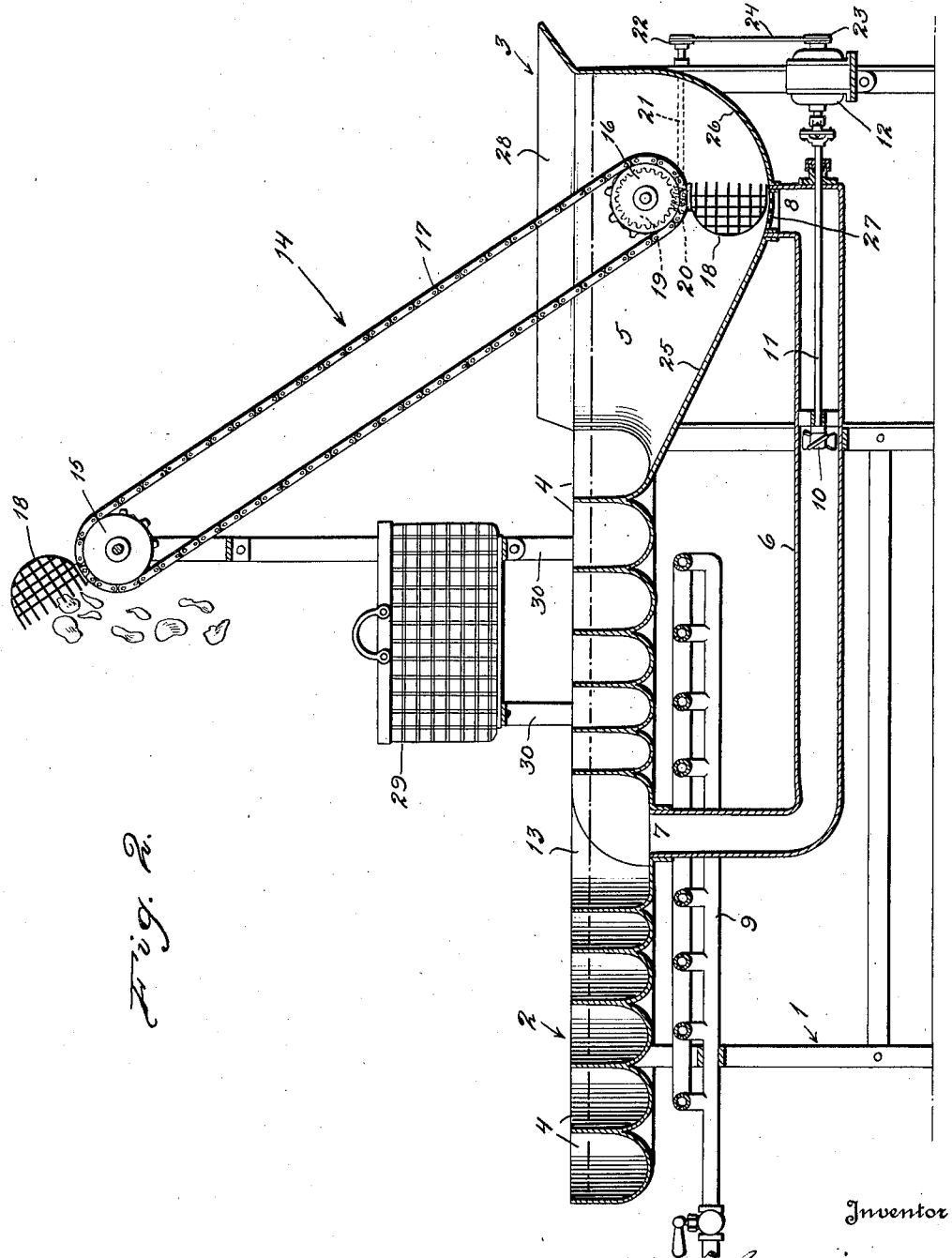

1,641,262

UNITED STATES PATENT OFFICE.

ROBERT A. FONTAINE AND THOMAS H. SELF, OF MARTINSVILLE, VIRGINIA, ASSIGNORS OF ONE-HALF TO SAID SELF AND ONE-HALF TO HORATIO A. RICHARDSON, BOTH OF MARTINSVILLE, VIRGINIA.

POTATO-CHIP COOKER.

Application filed June 8, 1925. Serial No. 35,567.

This invention relates to cooking apparatus.

The principal object of the invention, generally stated, is to provide a device or apparatus by means of which crullers, doughnuts or the like may be cooked or whereby thin slices of potatoes may be cooked in the manufacture of potato chips, the device being so constructed and arranged as to carry out the work on a large scale.

The object of the invention, more specifically stated, is to provide a device by means of which doughnuts or the like or previously sliced potatoes will be cooked while carried along by a body of boiling grease, special means being provided for causing the grease to move along in a continuous current for conducting the potato chips or other articles from the inlet to the discharge.

Another object of the invention is the provision of a device of this character embodying a spiral channel containing the grease and along which the potato chips or other articles are conducted, the width of the successive convolutions of the channel increasing proportionately to the increase in diameter of the convolutions whereby the rate of flow of the current of grease will be retarded sufficiently that the cooking will be carried out properly and thoroughly, the increase in diameter also accommodating the increase in size of doughnuts, or the like, during cooking so that they will not jam in the passage or channel.

A further object of the invention is to provide a cooking device of this type having incorporated therein a discharge elevator for removing the cooked chips from the boiling grease and depositing them into a drain receptacle arranged in position to receive the benefit of the heat rising from the device so that the cooked chips will be thoroughly dried.

An additional object of the invention is the provision of an apparatus of this character which will be comparatively simple and inexpensive in manufacture, easy to control and operate as well as efficient and durable in service.

To the attainment of the foregoing and other objects and advantages the invention may consist in the construction, arrangement and combination of parts to be hereinafter more fully described and claimed, and illustrated in the accompanying drawings in which:

Figure 1 is a plan view of the device; and

Figure 2 is a longitudinal vertical section taken centrally therethrough.

Referring more particularly to the drawings, the numeral 1 designates, generally, any suitable supporting frame upon which is mounted the vat, tank or pan indicated generally at 2 which may be of substantially circular shape throughout its major portion and provided with a laterally extending portion 3. The vat or pan is provided with a spiral channel 4 leading from the center and continuing throughout the extension portion 3 to define a receiving chamber, as shown at 5. Located beneath the vat or pan is a pipe or conduit 6 which has one end communicating with the center of the spiral channel, as shown at 7, and which has its other end communicating with the bottom of the chamber portion 5, as shown at 8.

The vat or pan is intended to be filled to any desired level with oil or grease of the character commonly employed for cooking potato chips, doughnuts and the like, and as it must be maintained at a high temperature we have shown heating means 9 located beneath the vat. While it is of course true that heating devices of different types may be used, it is preferable that it consist of gas or oil burners owing to the ease with which they may be controlled.

To provide a constant circulation of the grease throughout the channel some type of pump mechanism must be provided and in carrying out this feature we prferably use a propeller device including a propeller blade 10 carried by a shaft 11 suitably journaled through the outer end portion of the conduit 6 and driven by any desired means as for instance by an electric or other motor 12, though there is no restriction in this respect. A feature of importance is the fact that the successive convolutions of the spiral channel are of greater width as their diameters increase so that the rate of flow of the current of grease or oil will be retarded. Logically, if all of the convolutions were of the same width the rate of flow in the outermost one would be the same as in the others. By increasing the width of the successive convolutions, it is clear that the volume is increased and the rate of flow decreased. This insures sufficient time for effecting thorough cooking and permits accommodation of the cooked articles as they may swell during the operation.

The potato slices to be cooked are dumped into the central portion 13 of the vat or pan and will of course be carried along the current of grease or oil until they reach the receiving chamber 5. By the time the slices have reached this point and have been subjected to the action of the heated liquid they will of course be cooked. Any desired means might be provided for effecting removal of the cooked chips but a preferred arrangement is to provide an elevating conveyor, indicated generally at 14. The detailed structure of this elevator may of course be readily varied though it is here shown as including suitably journaled or mounted sprockets 15 and 16 located respectively above the vat and within the chamber 5, and peripherally engaged by a chain 17 carrying wire screen or other reticulated buckets 18. Any desired means may be provided for driving the elevator though in the present instance we have shown the shaft of the lower sprocket 16 as carrying a worm wheel 19 engaged by a worm 20 on a shaft 21 driven in any preferred manner by the motor 12, as for instance by the pulleys 22 and 23 and belt 24.

The bottom 25 of the receiving chamber 5 slopes downwardly and outwardly and merges into a curved end wall 26 having a curvature preferably the same as the path of movement of the buckets 18 as they pass about the lower sprocket of the elevator so that the chips entering and accumulating within this chamber portion 5 will be scooped up by the buckets. To prevent any chips or fragments thereof from entering the conduit 6 the inlet 8 thereof in the bottom of the chamber portion 5 is equipped with a screen or strainer 27.

As the cooked chips are carried upwardly by the elevator conveyor any grease adhering to the chips may of course drain off through the buckets 18 and drop back into the vat or pan. To avoid splashing and possible dropping of the grease beyond the sides of the vat extension 3, the latter is preferably provided or formed with an outwardly extending guard or apron 28. To continue the draining and effect drying of the chips they are preferably discharged into a receiving basket 29 resting upon suitable supports 30 and located above the vat or tank in such position that the heat rising therefrom will effect the desired drying.

From the foregoing description and a study of the drawings, it will be apparent that we have thus provided a simple and easily controlled cooker for producing potato chips, doughnuts and similar articles, and one in which the action is practically automatic, requiring but little attention. As the time necessary for effecting cooking is short it is clear that the machine is well adapted for use where a large output is desired.

While we have shown and described a preferred embodiment of the invention, it should be understood that the right is reserved to make changes and modifications in the detailed features and in the arrangement and combination of parts, provided such variations constitute no departure from the salient features of the invention or the scope of the appended claims.

Having thus described the invention, we claim:

1. In a cooking device of the character described, a vat having a spiral channel therein and provided at one side with an extension constituting a receiving chamber, a conduit leading from the bottom of said chamber to the center of the channel, liquid flow producing means within the conduit, elevator discharge means operating within the chamber, and a receiver mounted above the vat and receiving from said discharge means.

2. In a cooker of the character described, a vat having a channel therein and provided at one side with a lateral extension constituting a receiving chamber, the vat being adapted to contain oil or grease, heating means beneath the vat, means establishing communication between the chamber and the beginning of the channel, means for producing circulation of the oil or grease, and a discharge elevator conveyor operating within the chamber and including reticulated buckets, the bottom of the chamber being inclined downwardly from the channel and merging into a curved end wall coincident with the path of travel of the buckets.

3. In a cooker of the character described, a vat having a channel therein and provided at one side with a lateral extension constituting a receiving chamber, the vat being adapted to contain oil or grease, heating means beneath the vat, means establishing communication between the chamber and the beginning of the channel, means for producing circulation of the oil or grease, and a discharge elevator conveyor operating within the chamber and including reticulated buckets, the bottom of the chamber being inclined downwardly from the channel and merging into a curved end wall coincident with the path of travel of the buckets, the buckets permitting draining of articles accumulating within the chamber, the upper edge of the extension being provided with an outwardly extending apron for catching drippings.

4. In a cooker of the character described, a vat formed with a spiral channel and provided at one side with a lateral extension constituting a receiving chamber, a conduit leading from the bottom of the chamber to the center of the spiral, and propeller means within the conduit, the successive convolutions of the channel being of different sizes.

5. A liquid circulation device comprising a vat having a spiral channel therein and provided with a lateral extension constituting a receiving chamber, a conduit leading from the bottom of said chamber to the center of the spiral channel, and circulation producing means in the conduit, the successive convolutions of the spiral channel being of progressively increasing width.

6. A liquid circulation device comprising a vat having a spiral channel therein and provided with a lateral extension constituting a receiving chamber, a conduit leading from the bottom of said chamber to the center of the spiral channel, and circulation producing means in the conduit, the successive convolutions of the spiral channel being of progressively increasing width whereby the cross-sectional area of the successive convolutions will be increased proportionately to the increase in diameter.

7. In a liquid circulation device, a vat having a convolute channel therein and provided with a lateral extension constituting a chamber receiving from the channel, a conduit leading from said chamber to the entrance end of the channel, circulation producing means within the conduit, the outer portion of the convolute channel being of greater cross-sectional area than the inner portion.

8. In a cooker of the character described, a vat having a channel therein and having a receiving chamber at one side into which the channel leads, means for producing circulation of fluent cooking material along the channel and into the chamber, a support mounted above the intermediate portion of the vat and adapted to carry a receptable, and a discharge elevator conveyor dipping into said chamber and discharging into a receptacle on said support.

9. In a cooker of the character described, a vat having a continuous circuitous channel therein having portions of different widths, and means for producing a current of liquid grease along the channel.

10. In a cooker, a vat having a channel therein of successive convolutions of progressively varying size, and means for producing a flow of liquid grease along the channel.

In testimony whereof we affix our signatures.

ROBERT A. FONTAINE.
THOMAS H. SELF.